(12) United States Patent
Oak

(10) Patent No.: US 6,954,895 B1
(45) Date of Patent: Oct. 11, 2005

(54) METHOD AND APPARATUS FOR USING AND STORING OBJECTS

(75) Inventor: Abhijit Oak, Orinda, CA (US)

(73) Assignee: Autodesk, Inc., San Rafael, CA (US)

(*) Notice: Subject to any disclaimer, the term of this patent is extended or adjusted under 35 U.S.C. 154(b) by 0 days.

(21) Appl. No.: 09/532,462

(22) Filed: Mar. 22, 2000

(51) Int. Cl.$^7$ ............................................. G06F 17/00
(52) U.S. Cl. ..................................... 715/502; 717/107
(58) Field of Search ...................... 717/107; 713/201; 707/103 R, 9, 4, 102, 203; 709/316; 719/315; 715/502; 703/7

(56) References Cited

U.S. PATENT DOCUMENTS

| | | | |
|---|---|---|---|
| 5,408,659 A | 4/1995 | Cavendish et al. | |
| 5,675,782 A | 10/1997 | Montague et al. | |
| 5,732,270 A | 3/1998 | Foody et al. | |
| 5,761,669 A | 6/1998 | Montague et al. | |
| 5,826,258 A * | 10/1998 | Gupta et al. | 707/4 |
| 5,845,281 A * | 12/1998 | Benson et al. | 707/9 |
| 5,893,118 A * | 4/1999 | Sonderegger | 707/203 |
| 6,032,150 A * | 2/2000 | Nguyen | 707/102 |
| 6,209,103 B1 * | 3/2001 | Schreiber et al. | 713/201 |
| 6,272,672 B1 * | 8/2001 | Conway | 717/107 |
| 6,298,446 B1 * | 10/2001 | Schreiber et al. | 713/201 |
| 6,327,627 B1 * | 12/2001 | Orton et al. | 719/328 |
| 6,466,953 B1 * | 10/2002 | Bonney et al. | 715/502 |
| 6,578,090 B1 * | 6/2003 | Motoyama et al. | 719/315 |
| 2001/0018644 A1 * | 8/2001 | Schwalb et al. | 703/7 |

OTHER PUBLICATIONS

Dougherty et al., The Mosaic Handbook, 1994, O'Reilly & Associates Inc., p 111.*
Oliver, Netscape 2 Unleashed, 1996, sams.net publishing, p. 360.*
Morrison, "Sams Teach Yourself MFC in 24 Hours", 1999, pp. 161-162.*
Knakkergaard, "Drawing transparent bitmaps using CImage", posted Sep. 18, 2001, http://www.codeproject.com/bitmap/trans_cimage.asp.*
Segar, "Drawing Transparent Bitmap with ease with on the fly masks in MFC", posted Aug. 25, 2000 http://www.codeproject.com/bitmap/transbitmapmask.asp.*
Background on CBitmap class downloaded from http://msdn.microsoft.com, downloaded Mar. 4, 2004.*
E. Fleischman, 1998, rfc2361, 4 pages.
Tom Sheldon, 1996, General Firewall White Paper, 9 pages.
Internet Article, "LoadBitmap", http://msdn.microsoft.com/library/en-us/gdi/bitmaps_4c34.asp?frame=true, ©2004 Microsoft Corporation, pp. 1-3.
E. Fleischman, 1998, rfc2361, 4 pages.
Tom Sheldon, 1996, General Firewall White Paper, 9 pages.

* cited by examiner

*Primary Examiner*—Joseph Feild
*Assistant Examiner*—James H. Blackwell
(74) *Attorney, Agent, or Firm*—Gates & Cooper LLP

(57) ABSTRACT

To address the requirements described above, one or more embodiments of the invention provide a method, apparatus, and article of manufacture for using and storing objects. Object data is stored separately from a file containing an instance of the object. The object data may be stored on a secure server and may be maintained by a manufacturer or supplier. A portion of the object and a reference to the object data is stored with the file. When the file is opened in an application, the portion of the object and the reference are utilized to retrieve the object data (if the user has the appropriate access permissions). Thereafter, the object can be utilized and displayed. In accordance with embodiments of the invention, catalogs of object data may be maintained. Additionally, object data is secure such that objects cannot be utilized unless the appropriate access permissions are obtained. If appropriate access permissions are not obtained, the user may only be able to view a blank or "empty" document or drawing.

36 Claims, 7 Drawing Sheets

METHOD AND APPARATUS FOR USING AND STORING OBJECTS

BACKGROUND OF THE INVENTION

1. Field of the Invention

The present invention relates generally to computer implemented objects, and in particular, to a method, apparatus, and article of manufacture for the storage and use of objects.

2. Description of the Related Art

The use of computer application programs to create files, documents, drawings, etc. is well known in the art. Commonly, the electronic files, documents, drawings, etc. consist of a collection of objects. For example, a drawing may consist of a collection of various objects such as a circle object, a line object, a cloud object, etc. FIG. 1 illustrates the storage and use of such objects. Application program 100 creates files 102. Files 102 consist of one or more objects. The files 102 are stored with their associated objects and all of the object data. Thus, all of the data and information for the objects is available with file 102 for application 100 to read, view, or process.

In some applications, catalogs of objects may be available to users. For example, a catalog of various types of windows or doors may be available for the user to select and utilize in a drawing application. When a user elects to utilize a particular object from a catalog, a copy of the object may be graphically displayed when the file 102 containing the object is displayed. Further, the copy of the object is stored with file 102. Thus, any manipulations of the object performed by the user are maintained and stored with the file 102.

Often, third parties (such as manufacturers) want to provide the ability for users to graphically represent a product in an application such as a drawing program. For example, a toilet manufacturer may want a user to have the ability to display and select one of their toilets (in the form of a toilet object) in a computer aided design (CAD) application. Further, it is desirable for the third party to have the ability to update the object. Without this ability, if a third party discontinues the sale of the physical product (and possibly replaces the discontinued product with a new similar product), the user with the original product must update the catalog and manipulate the drawing to replace the old object in the drawing with the new object.

Further, some corporations and companies may desire to restrict use of electronic files or drawings to internal use. For example, if a confidential or trade secret product is electronically represented as an object, the company may not want the document containing the object to be distributed, viewable, etc. externally. However, since a copy of an object is saved with a file 102, once the document is saved and distributed externally, the document (and its accompanying objects) may be viewed by anyone that obtains a copy of the document.

There is a need in the art to enable a user or developer to utilize an object in files, documents, drawings, etc. while maintaining the ability to easily change the object and maintain data/file security.

SUMMARY OF THE INVENTION

To address the requirements described above, one or more embodiments of the invention provide a method, apparatus, and article of manufacture for using and storing objects. Object data is stored separately from a file containing an instance of the object. The object data may be stored on a secure server and may be maintained by a manufacturer or supplier. A portion of the object and a reference to the object data are stored with the file. When the file is opened in an application, the portion of the object and the reference are utilized to retrieve the object data (if the user has the appropriate access permissions). Thereafter, the object can be utilized and displayed.

In accordance with embodiments of the invention, catalogs of object data may be maintained. Additionally, object data is secure such that objects cannot be utilized unless the appropriate access permissions are obtained. If appropriate access permissions are not obtained, the user may only be able to view a blank or "empty" document or drawing.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and in which is shown, by way of illustration, several embodiments of the present invention. It is understood that other embodiments may be utilized and structural changes may be made without departing from the scope of the present invention.

Overview

The present invention discloses a method, apparatus, and article of manufacture for accessing and storing objects. Object data (that is required to access, utilize, or display an object) is stored in a file separate from the file containing an instance of the object. Further, the object data may be stored remotely on a secure server. When the file containing an instance of the object is opened, a reference or link to the object data is followed to obtain the object data. Thereafter, the file containing the instance of the object may be viewed normally.

Hardware Environment

Figure 1:
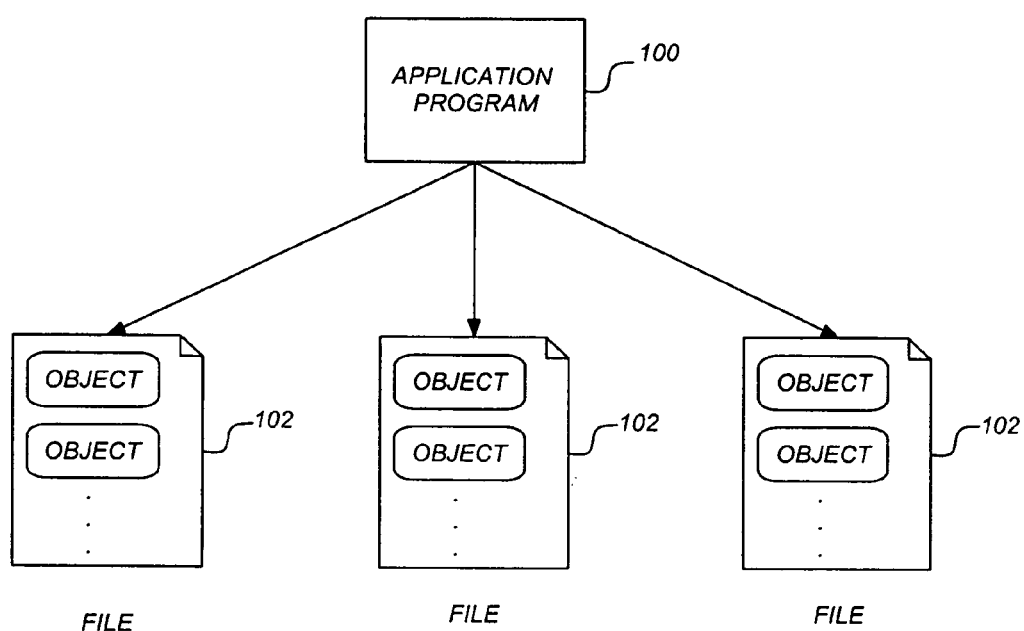
FIG. 1 illustrates the storage and use of such objects.
Figure 2:
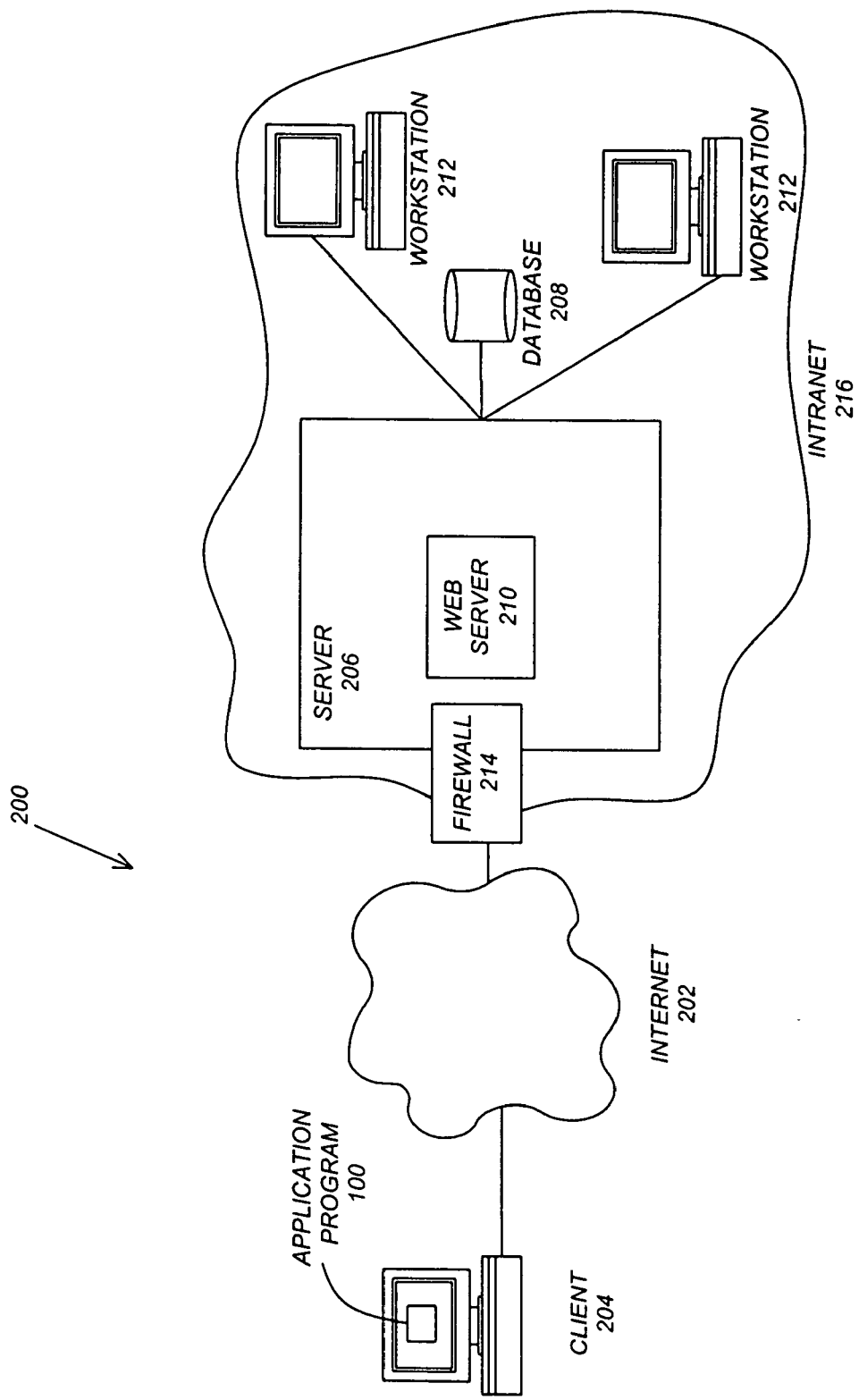
FIG. 2 schematically illustrates a hardware and software environment in accordance with one or more embodiments of the invention.

FIG. 2 schematically illustrates a hardware and software environment in accordance with one or more embodiments of the invention, and more particularly, illustrates a typical distributed computer system 200 using the Internet 202 to connect client computers 204 to server computers 206 and workstations 212. A typical combination of resources may include a network comprising the Internet 202, intranets 216, LANs (local area network), WANs (wide area network), SNA (systems network architecture) networks, or the like, clients 204, servers 206, and workstations 212. Clients 204, servers 206 and workstations 212 may be personal computers, workstations, minicomputers, mainframes, etc.

The Internet 202 connects client computers 204 to server computers 206 executing Web servers 210 and workstations 212. The Web server 210 is typically a program such as the Apache Server on Microsoft's Internet Information Server. In one or more embodiments, the servers 206 also interface and/or manage a database 208. Further, in one or more embodiments, access (network traffic) from and to intranet 216 may be controlled (for security or other reasons) by a hardware or software device referred to as a network security device or firewall 214.

Generally, components 202–216 all comprise logic and/or data that is embodied in or retrievable from a device, medium, signal, or carrier, e.g., a data storage device, a data communications device, a remote computer or device coupled to the computer across a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, or different devices, may be used to implement the present invention, so long as similar functions are performed thereby. Specifically, those skilled in the art will recognize that the present invention may be applied to any database, associated database management system, or peripheral device.

Embodiment Details

As described above, documents and files are composed of various components such as objects. For example, drawings may consist of a circle object, line object, text object, etc. The components are represented by data stored in the memory of a computer. The data can be organized to represent a group of components, a particular component, or properties and attributes of a component. For example, some data may represent the graphical representation of the components, while the other data may represent content (e.g., the actual text of a document), while other information may represent formatting information, etc. A component is dependent on this data such that the component must have access to the data in order for the component to be resurrected, used, displayed, etc.

In accordance with one or more embodiments of the invention, the data is stored external to the file/document itself. For example, the graphical representation of drawing component properties like color, linetype, lineweight, layer, and constraint information may be stored external to the drawing. The data may be stored in ASCII or XML format. Additionally, the data may be stored on a secure server such as web server 210. Further, a reference or link to the object data is stored with the file.

Figure 3A:
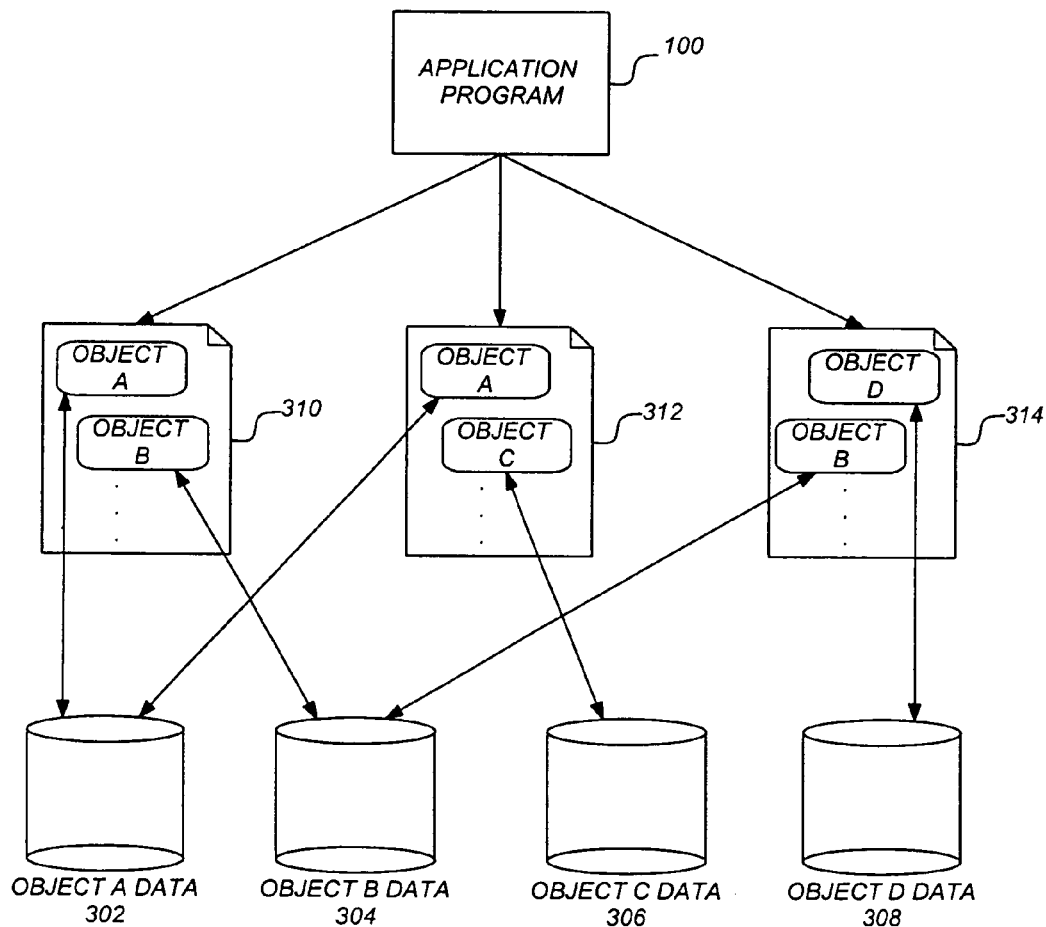
FIGS. 3A–3C illustrate the storage of object data in accordance with one or more embodiments of the invention.
Figure 3B:
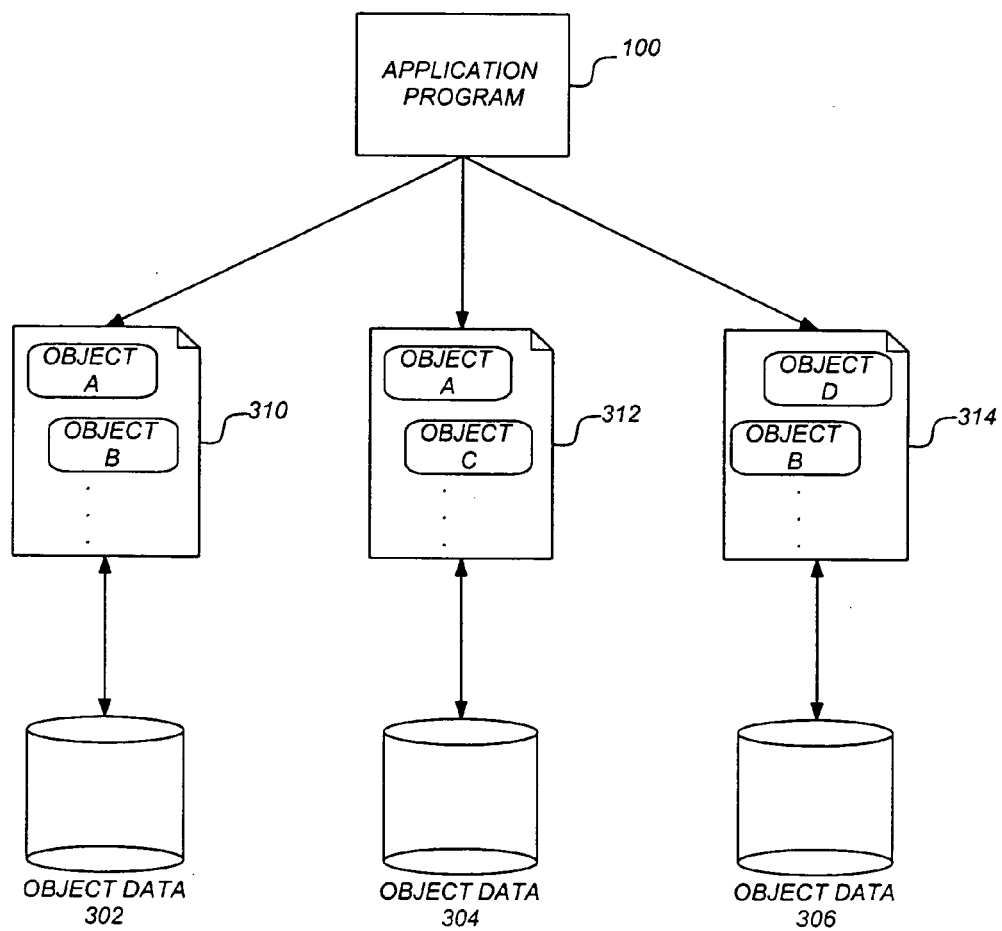
Figure 3C:
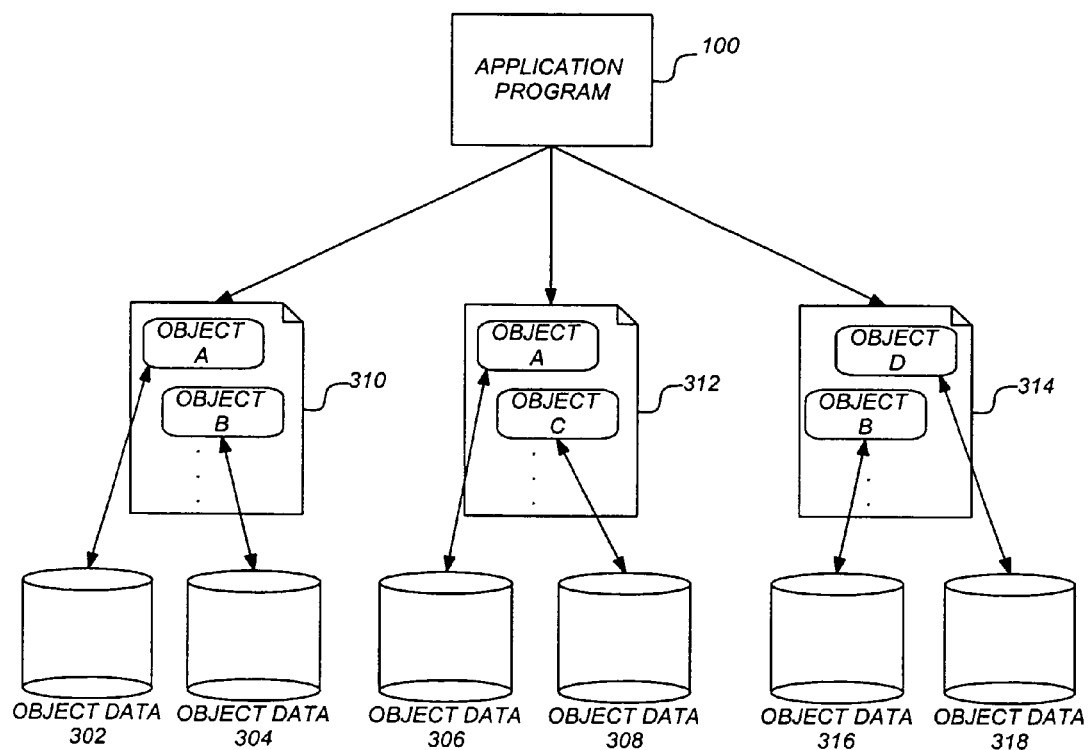

FIGS. 3A–3C illustrate the storage of the object data in accordance with one or more embodiments of the invention. In FIG. 3A, the data for a particular object is stored in a particular location separate from the file 310–314. Thus, in FIG. 3A, all data for object A (regardless of the file 310–314 where the object is being utilized) is stored in the same location 302. Similarly, all data for object B is stored in the same location 304, all data for object C is stored in the same location 306, and all data for object D is stored in the same location 308. In FIG. 3B, the data for all objects in a particular file 310–314 are stored in the same location. Thus, the object data for the objects in file 310 is stored together 302. Similarly, the object data for objects in file 312 is stored together 304 and the object data for objects in file 314 is stored together 306. In FIG. 3C, the data for each instance of an object is stored separately. Thus, the data for object A of file 310 is stored in 302, the data for object B of file 310 is stored in 304, the data for object A of file 312 is stored in 306, the data for object C of file 312 is stored in 308, the data for object B of file 314 is stored in 316, and the data for object D of file 314 is stored in 318. As described above, the location of the object data storage 302–308 and 316–318 may be on a secure server such as web server 210.

Figure 4:
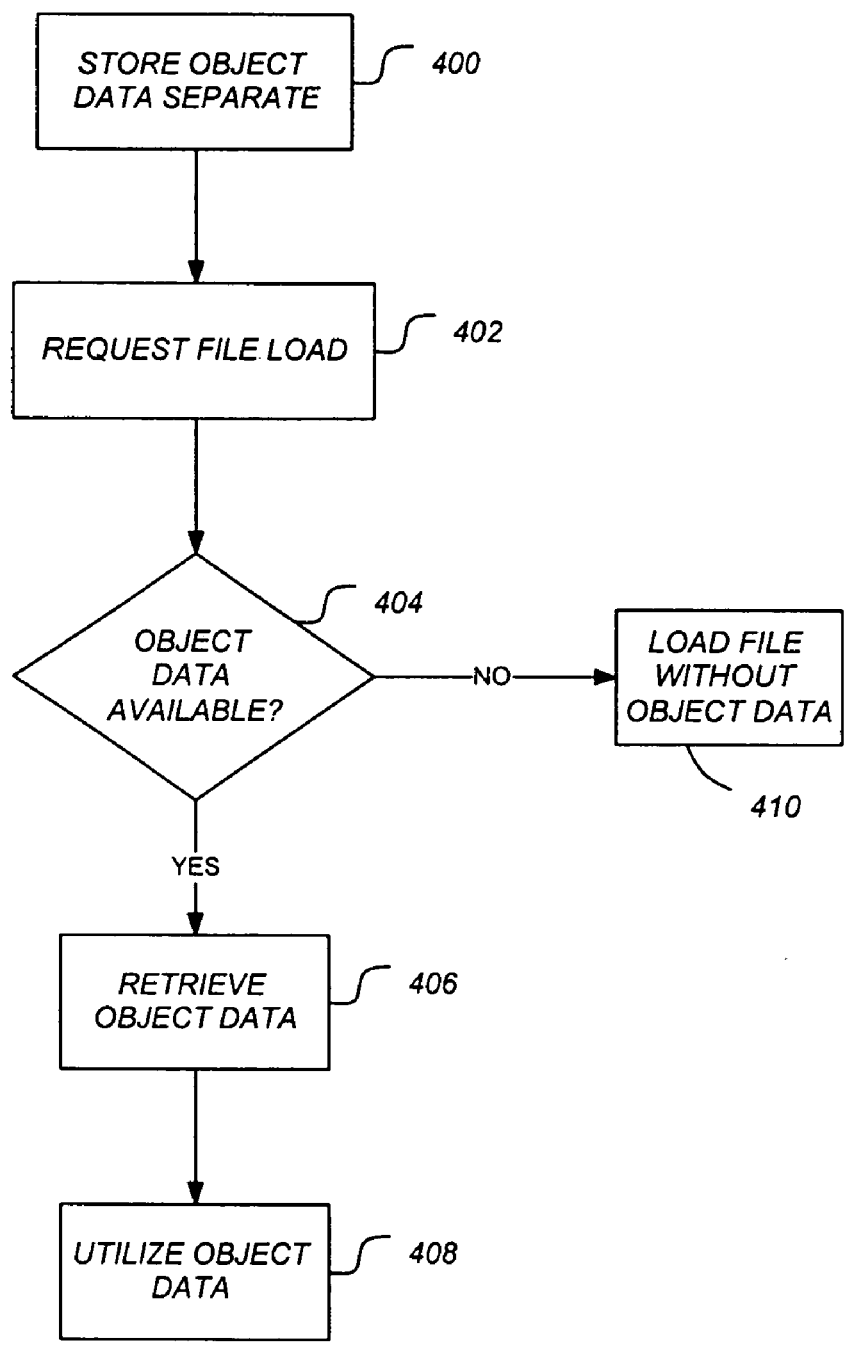
FIG. 4 illustrates the use of object data in accordance with one or more embodiments of the invention.

Since an object is dependent on its object data, in order to utilize an object in a file/document 310–314, the object data must be retrieved, obtained, or accessed. FIG. 4 illustrates the use of object data in accordance with one or more embodiments of the invention. At step 400, the object data is stored separately 302–308 and 316–318 from the file 310–314. The object data may be stored in accordance with any of the configurations set forth in FIGS. 3A–3C. At step 402, a request to load or view a file is made. For example, a user may attempt to open a document or drawing.

At step 404, a determination is made regarding whether or not the object data is available to the application. The reference or link to the object data that is stored with the file may be followed to make this determination. If the object data is available, the data is retrieved at step 406 and utilized at step 408. For example, if the object data is stored locally, and the application program requesting access to the data is local (and has the appropriate access permissions), the object data is available and may be retrieved at step 406 and utilized at step 408 to view a file such as a document or drawing.

If the object data is not available to the application, the file is loaded without the object data at step 410. For example, if the object data has been deleted, or the user does not have the proper access permissions, the object data may not be available. Consequently, the file may be opened without using the object data. Loading a file without the data does not provide a complete version of the file to the user. Accordingly, a blank or "empty" file/document may be displayed to the user. For example, if a drawing is being loaded and objects representing various shapes of the drawing are utilized, blank areas may be displayed to the user where the shapes should appear if the data that provides the graphical representation of the object is not available. Similarly, the text of a document may not be displayed if the data containing the text is stored separately and is not available.

By storing the object data separate from the file containing an instance of the object, many advantages are available. Such advantages include the ability for users to update the data separate form the file itself and have the file utilize the updated and most current representation. For example, if a user or third party makes changes to object data, the document containing an instance of the object can be automatically updated to use the changed data. Thus, instead of updating each document containing an instance of the object, only the data for the object is updated (by either the user or the third party that controls the object data). In some applications, a user can be prompted to determine whether the changed data or the old data for the object should be utilized.

In one or more embodiments, the object data is stored in ASCII or XML format. In such embodiments, the object data can be easily edited and duplicated to form the definition of the objects.

In accordance with one or more embodiments of the invention, universally unique identifiers (UUIDs) and other signatures may be used to match object data with the exact object. UUIDs uniquely identify objects such as interfaces, manager entry-point vectors, and client objects. Consequently, when a file is opened, the object examines the reference/link to obtain the location and checks for the correct signature (by searching for the UUID) at the reference/link location (such as server 206 (intranet or internet)). If a match is found, the data/information can be used to update its representation. Thus, at step 404, the object determines if the object data is available by checking for the correct signature on the server 206.

If the file is a drawing, the graphical representation may only be made available when access to the external object data is available. If the object data is not available, only a blank drawing is displayed or viewable at step 410. As described, the reference/link can point to a location outside of the local network (e.g., across the internet). Accordingly, the technology may be utilized on the internet with the object data stored on a secure web server 210. The data can then be maintained by a third party such as a manufacturer on the third party's network. Consequently, whenever a file is opened locally on a client 204, the application program 100 follows the reference/link and may look anywhere on or across a network 202 to check for the correct signature and the object data on the server 206. In such an embodiment, the reference or mapping from the object to its data may comprise a URL (uniform resource locator).

The system of FIG. 4 can also be extended to the use of blocks such as in AutoCAD®. A block is a collection of objects that a user can associate together to form a single object, or block definition. A user can insert, scale, and rotate a block in a drawing. Further, a block can be exploded into its component objects, modified, and redefined. Current and future instances of the blocks can then be updated based on the block definition. In such an embodiment, the block definition contains a reference to or points to the object data (e.g., using a URL). Any changes in the block definition are then accessible by the reference. Further, changes can be easily tracked and the drawing can be easily updated. Thus the data in the drawing is no longer dated and can be updated easily when the part changes.

Various applications can utilize one or more embodiments of the invention. For example, secure documents may be created or catalogs or part specifications can be created. Additionally, the object data may be portrayed in real time over the internet. Each of these types of applications is described below.

Secure Documents

There is a general need in the industry to create secure documents. For example, trade secret, sensitive, proprietary, or confidential material may be contained in a file, document, or design data. With the advent of email, it is rather easy for someone to mail out a document (and all of its objects with it). Document management programs generally allow the functionality for revising control and access management to the document, but do not provide functionality in terms of securing the data in the document.

The system of the invention allows a user to secure a file within a secure company intranet 216. The document data is stored on a server 206, and a macro or custom entity allows the user to resurrect and utilize the data at runtime. The macro or custom entity may be an add-on or plug-in to an existing application such as AutoCAD®. However, if the document is mailed outside of the domain (e.g., across internet 202 to client 204), the document cannot be resurrected to create any usable data unless there is access to the secure domain/server 206. Such embodiments can be utilized in text documents, spreadsheets, drawings, etc.

Thus, as described above, web server 210 contains object data such as the graphical representation, color, constraints, etc., and unless the application has the proper access permissions, a network security device/firewall 214 will not permit the object data to be accessed or utilized. Consequently, the application 100 must gain access across a network security device such as firewall 214 to obtain and utilize the object data in order to represent the object data in the required format (e.g., as a graphical representation, text, etc.).

Catalogs or Part Specifications

One or more embodiments of the invention can be used to store lightweight representations of objects such as doors, windows, sinks, bolts, gears, etc. on supplier's web sites. This information is in simple ASCII or XML format and a supplier can easily update it. The object data can then be used to resurrect the object graphically in the drawings. Each part can be identified with a UUID, a version number, information about replacement parts, revision notes, availability, price, etc. and each time the drawing is opened, all of the parts in it update with the latest information that is available on the internet 202. This allows the user to see what is available to complete a project. Further, existing drawings can be used for facility management for maintenance projects as the drawing gives the user accurate data about the part. The part data that is stored on the supplier's web site is rather small in size and can move through the internet 202 pipeline rather easily.

For example, assume an architectural drawing contains a bathroom sink that was manufactured by Kohler. In the prior art, the data is dated and saved with the architectural drawing such that there is no automated method to update the sink data. If Kohler updates the sink definition or removes it from its inventory, the prior art does not provide a mechanism to effectively update the drawing. Using embodiments of the invention, once the user opens the drawing, the drawing application (e.g., AutoCAD®) informs the user that the part is no longer available. Additional information may direct the user to a different matching part or the site of a manufacturer that makes a similar product. Such user redirection may be based on data specified by the user. For example, a user may specify that whenever it is redirected to an alternate manufacturer, the program should automatically search and obtain a part that has similar criteria such as color, style, price, etc. Any type or format of criteria may be specified by a user.

Figure 5:
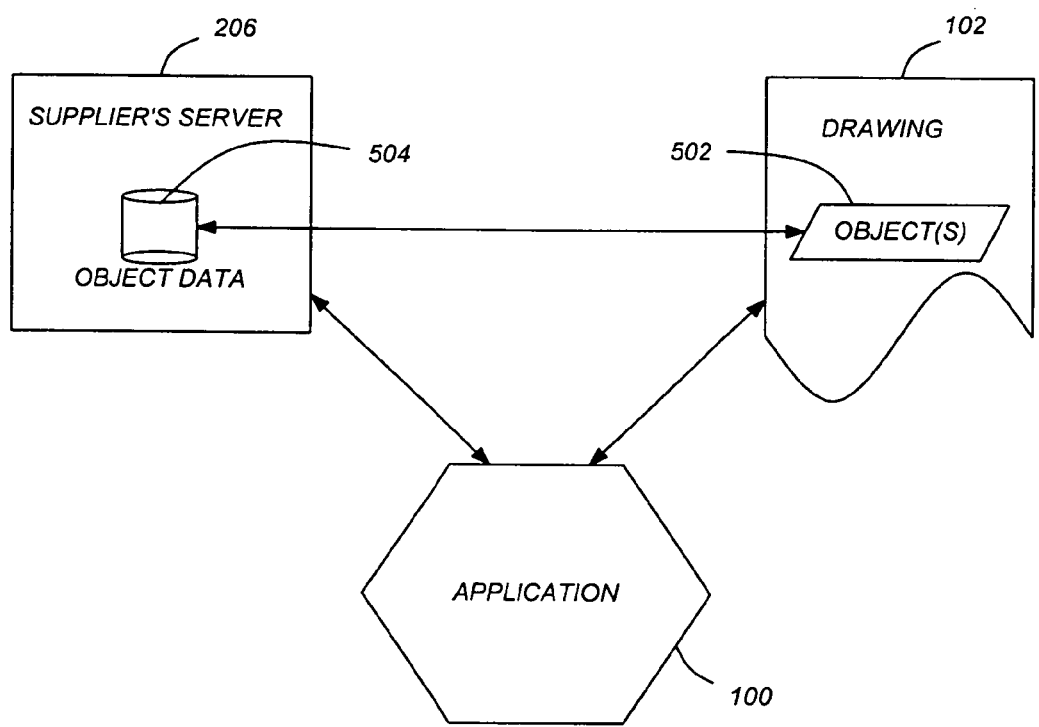
FIG. 5 illustrates the interaction between a server, an application, and a drawing in accordance with one or more embodiments of the invention.

Accordingly, object data is not tied to a specific program or file and lives independently. Thus, suppliers, manufacturers, distributors, etc. may create the data by themselves or by using an application program such as AutoCAD®. FIG. 5 illustrates the interaction between a server 206, an application 100, and a drawing 102. The supplier's server 206 contains data 504 about the parts list. Drawing 102 has objects 502 that point to the data 504 on the supplier's web site 206. The drawing application 100 contains an add-on, plug-in, or other application that updates the part graphics in drawing 102 with data 504 from the supplier's web site 206.

Real-Time Portrayal of Object Data

In accordance with one or more embodiments of the invention, the data 504 of an object is portrayed across the internet 202 in a file 100 in real time. Thus, instead of portraying the status of an object such as a change or modification in an email or spreadsheet, the object is portrayed in real time when an object 502 is utilized. Such real-time usage occurs across the internet 202. Further, the application 100 continues to display and access the entire drawing 102 (including objects 502 and its related object data 504) as if the entire drawing is stored locally. For example, the application 100 can portray the status on a construction site graphically in relation to a drawing 102 instead of in a spreadsheet or email.

CONCLUSION

Numerous benefits result from using a method and apparatus in accordance with the invention: intelligent drawings and objects are utilized; object versions are always maintained (transparently or non-transparently to the user); security is maintained at the object level; the server components are productized; and the number of web "hits" to a supplier's web site increases.

Additionally, use of the invention may provide valuable business opportunities including cataloging a manufacturer's space, catalog subscription services, the creation and sale of object data server products, and the licensing of security technology.

In summary, the present invention discloses a method, apparatus, and article of manufacture for using and storing objects. Object data is stored separately from a file containing an instance of the object. The object data may be stored on a secure server and may be maintained by a manufacturer or supplier. A portion of the object and a reference to the object data is stored with the file. When the file is opened in an application, the portion of the object and the reference are utilized to retrieve the object data (if the user has the appropriate access permissions). Thereafter, the object can be utilized and displayed.

In accordance with embodiments of the invention, catalogs of object data may be maintained. Additionally, object data is secure such that objects cannot be utilized unless the appropriate access permissions are obtained. If appropriate access permissions are not obtained, the user may only be able to view a blank or "empty" document or drawing.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description.

I claim:

1. A method for utilizing an object that is dependent on object data comprising:
   (a) storing a lightweight representation of the object as object data separate from a file containing an instance of the object, wherein:
      (i) the file comprises a drawing;
      (ii) the object comprises a drawing component; and
      (iii) the object data comprises a drawing component property;
   (b) obtaining a request to load the file;
   (c) determining if the object data is available; and
   (d) if the object data is available:
      (1) obtaining the object data; and
      (2) utilizing the object data to resurrect the object graphically in the drawing.

2. The method of claim 1 further comprising displaying an empty graphical representation if the object is not available.

3. The method of claim 1 further comprising storing a universally unique identifier (UUID) with the file to match the object and the object data.

4. The method of claim 1 further comprising storing a reference to the object data in the file.

5. The method of claim 4 wherein the reference is a uniform resource locator (URL).

6. The method of claim 1 wherein the object data is stored on a secure server and wherein the determining if the object data is available further comprises determining if the request to load the file provides proper access permissions for the object data.

7. The method of claim 6 wherein the request to load the file originates from outside of a network where the object data is stored and the object data is not available because a network security mechanism determines that the request does not provide the proper access permissions.

8. The method of claim 1, wherein:
   the separate location is on a supplier's network;
   a supplier maintains and updates the object data; and
   the drawing component comprises a part offered by the supplier that is used in the drawing.

9. The method of claim 1 wherein the utilizing the object data occurs in real time across a network.

10. A computer implemented system for utilizing an object that is dependent on object data comprising:
    (a) an object dependent on object data, wherein the object data comprises a lightweight representation of the object;
    (b) a file containing an instance of the object, wherein:
       (i) the file comprises a drawing;
       (ii) the object comprises a drawing component; and
       (iii) the object data comprises a drawing component property;
    (c) means for storing the object data in a separate location from the file;
    (d) means for obtaining a request to load the file;
    (e) means for determining if the object data is available, and if the object data is available:
       (1) means for obtaining the object data; and
       (2) means for utilizing the object data to resurrect the object graphically in the drawing.

11. The system of claim 10 further comprising means for displaying an empty graphical representation if the object data is not available.

12. The system of claim 10 further comprising a universally unique identifier (UUID) that may be utilized to match the object and the object data.

13. The system of claim 10 wherein the file further comprises a reference from the object to the object data.

14. The system of claim 13 wherein the reference is a uniform resource locator (URL).

15. The system of claim 10 further comprising:
    a secure server where the object data is stored; and
    wherein the means for determining if the object data is available further comprises means for determining if the request to load the file provides proper access permissions for the object data.

16. The system of claim 15 wherein the request to load the file originates from a network other than a network that hosts the secure server where the object data is stored and the object data is not available because a network security mechanism determines that the request does not provide the proper access permissions.

17. The system of claim 10 wherein:
the separate location is on a supplier's network;
a supplier maintains and updates the object data; and
the drawing component comprises a part offered by the supplier that is used in the drawing.

18. The system of claim 10 wherein the means for utilizing the object data occurs in real time across a network.

19. An article of manufacture embodying logic for performing a method for utilizing an object that is dependent on object data, the method comprising:
 (a) storing a lightweight representation of the object as object data separate from a file containing an instance of the object, wherein:
  (i) the file comprises a drawing;
  (ii) the object comprises a drawing component; and
  (iii) the object data comprises a drawing component property;
 (b) obtaining a request to load the file;
 (c) determining if the object data is available; and
 (d) if the object data is available:
  (1) obtaining the object data; and
  (2) utilizing the object data to resurrect the object graphically in the drawing.

20. The article of manufacture of claim 19, the method further comprising displaying an empty graphical representation if the object data is not available.

21. The article of manufacture of claim 19, the method further comprising storing a universally unique identifier (UUID) with the file to match the object and the object data.

22. The article of manufacture of claim 19, the method further comprising storing a reference to the object data in the file.

23. The article of manufacture of claim 22 wherein the reference is uniform resource locator (URL).

24. The article of manufacture of claim 19 wherein the object data is stored on a secure server and wherein the determining if the object data is available further comprises determining if the request to load the file provides proper access permissions for the object data.

25. The article of manufacture of claim 24 wherein the request to load the file originates from outside of a network where the object data is stored and the object data is nor available because a network security mechanism determines that the request does not provide the proper access permissions.

26. The article of manufacture of claim 19 wherein:
the separate location is on a supplier's network;
a supplier maintains and updates the object data; and
the drawing component comprises a part offered by the supplier that is used in the drawing.

27. The article of manufacture of claim 19 wherein the utilizing the object data occurs in real time across a network.

28. The method of claim 1 wherein the object data comprises actual text content for a document.

29. The method of claim 1 wherein the object data comprises formatting information for displaying the object.

30. The system of claim 10 wherein the object data comprises actual text content for a document.

31. The method of claim 10 wherein the object data comprises formatting information for displaying the object.

32. The article of manufacture of claim 19 wherein the object data comprises actual text content for a document.

33. The article of manufacture of claim 19 wherein the object data comprises formatting information for displaying the object.

34. The method of claim 1 wherein the drawing is a computer aided design (CAD) drawing.

35. The system of claim 10 wherein the drawing is a computer aided design (CAD) drawing.

36. The article of manufacture of claim 19 wherein the drawing is a computer aided design (CAD) drawing.

* * * * *

UNITED STATES PATENT AND TRADEMARK OFFICE
CERTIFICATE OF CORRECTION

PATENT NO. : 6,954,895 B1 Page 1 of 1
DATED : October 11, 2005
INVENTOR(S) : Oak It is certified that error appears in the above-identified patent and that said Letters Patent is hereby corrected as shown below:

Column 9,
Line 37, "is uniform" should read -- is a uniform --.

Column 10,
Line 6, "nor" should read -- not --.

Signed and Sealed this

Ninth Day of May, 2006

JON W. DUDAS
*Director of the United States Patent and Trademark Office*